United States Patent Office 3,048,339
Patented Aug. 7, 1962

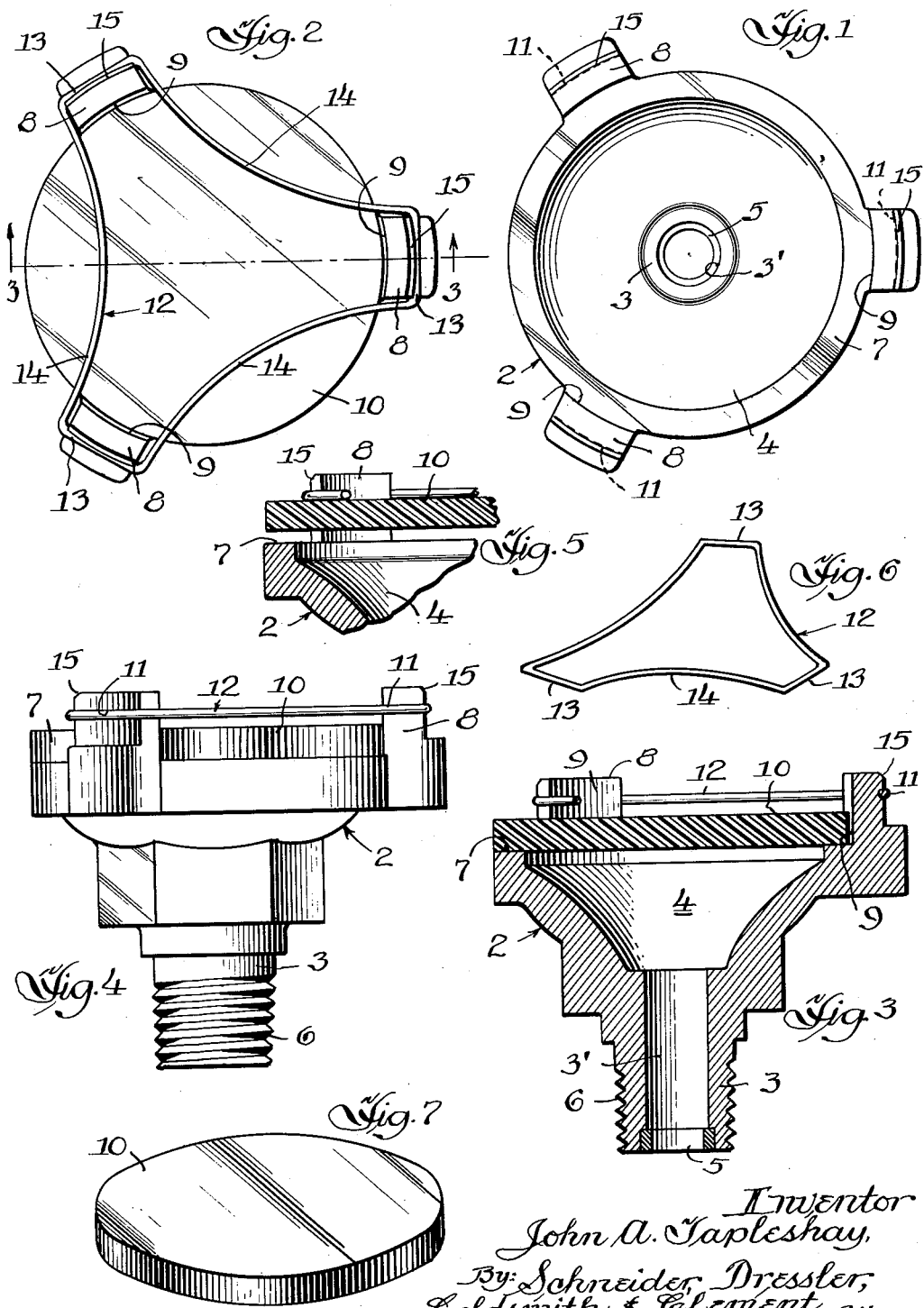

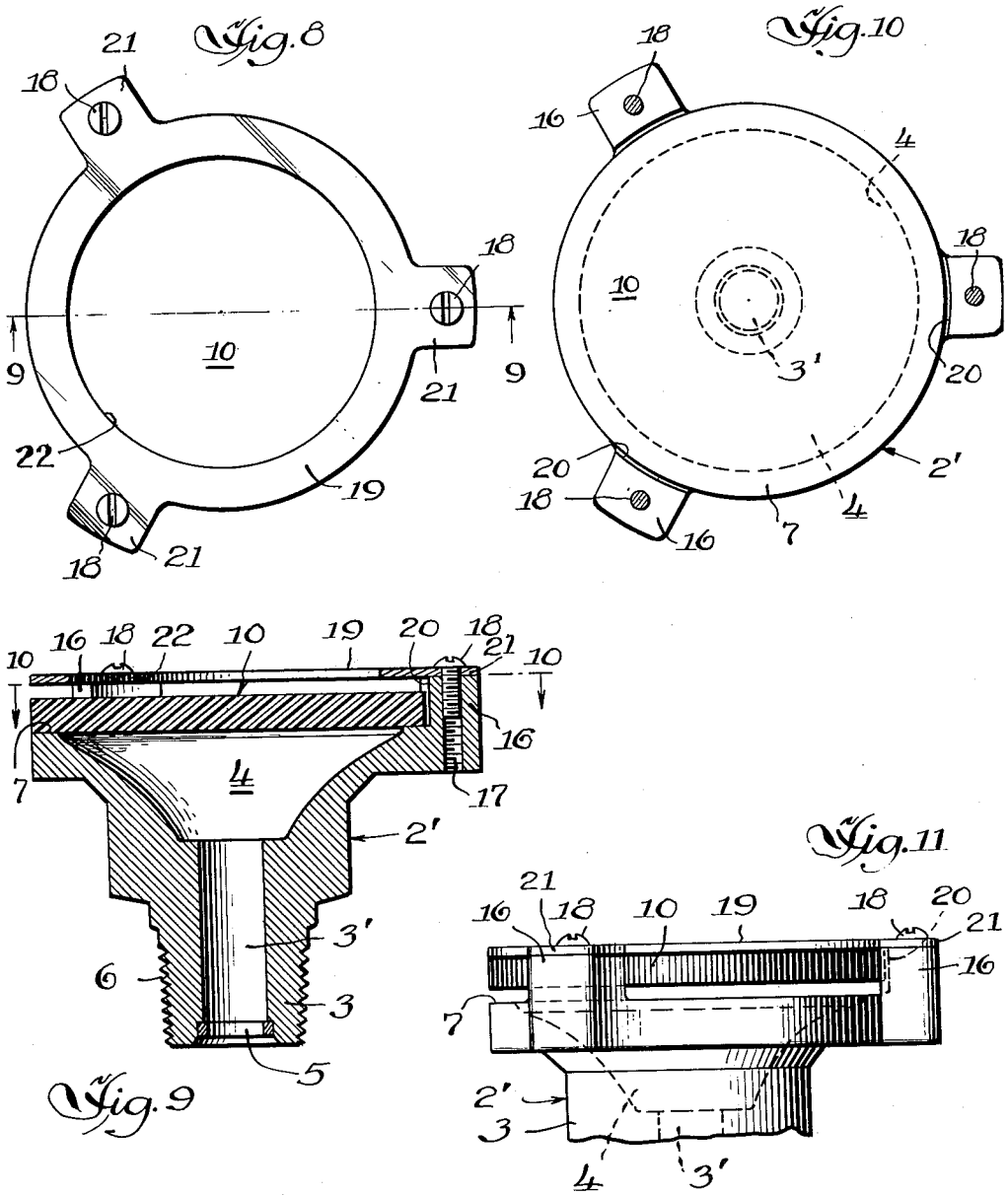

3,048,339
DIFFUSER
John A. Tapleshay, Sandy Springs, Ga., assignor to FMC Corporation, a corporation of Delaware
Filed Mar. 9, 1959, Ser. No. 798,191
13 Claims. (Cl. 239—571)

This invention relates to a diffuser in which a loosely mounted disc at one end of a fitting is restricted to limited movement relative to the fitting to allow predetermined amounts of air to escape between the disc and the rim of the fitting against which it is seated, to aerate the medium in which the diffuser is immersed when it is subjected to air pressure from within the fitting.

This application is a continuation-in-part of my prior copending application, Serial No. 696,810, filed November 15, 1957, now abandoned.

The diffuser of the present invention is intended primarily for aerating sewage, but may be used for any aeration process including the aeration and/or gasification of liquids used in the chemical industries. The diffuser is particularly advantageous in connection with the aeration of sewage in industrial waste plants in which the sewage may contain materials likely to cause porous diffusers to clog too rapidly for satisfactory use. The pressure of the sewage acts against the pressure of the air within the diffuser and tends to hold the disc in closed position, thereby causing the disc to flutter between its open and closed positions. This fluttering of the disc dislodges and/or wears away any solids that might otherwise become lodged between the disc and the rim of the fitting.

The fitting is provided with an enlarged air chamber having a flat rim at its outer end and an orifice at its other end threaded for connection with a header or other suitable source of air under pressure. The flat rim may be of any desired configuration, but preferably is circular. The disc is shaped to conform to the shape of the rim, and preferably the peripheral edges of the rim and the disc coincide when the disc is seated on the rim in position to close the outer end of the air chamber.

The outer end of the fitting is provided with three circumferentially spaced integral lugs that project beyond the plane of the flat surface of the rim. The inner surface of that portion of each lug which projects beyond the flat surface of the rim is recessed slightly to space such surfaces outwardly of the peripheral edge of the disc. Each of the lugs has means for securing a retaining member in a plane parallel to the flat surface of the rim and spaced therefrom a distance slightly greater than the thickness of the disc.

The disc is preferably made of a resin which is resistant to abrasion and to corrosive materials, such as, for example, polyvinyl chloride, but may be made of rubber, metal or any other material heavier than water. When the disc is positioned on the flat rim of the fitting the inner surfaces of the lugs restrict lateral movement of the disc in the plane parallel to the flat rim. The slight lateral movement permitted is sufficient to prevent the disc from binding against movement in a direction perpendicular to the flat rim. The perpendicular movement of the disc is restricted by a retaining member that has a section extending between the lugs so as to overlie the outer surface of the disc.

In operation, air entering the orifice from the header lifts the disc against the pressure of the sewage or other liquid in which the diffuser is immersed. The retaining member limits the outward movement of the disc. A slight lift of the disc causes air to escape between the disc and the flat rim of the air chamber. The size of the air chamber increases more or less uniformly from the orifice to the outer end, and the air pressure against the underside of the disc is substantially uniform throughout the area overlying the air chamber. The uniform air pressure lifts the disc evenly so that the flow of air between the disc and the flat rim is uniformly distributed around the circumference of the disc.

The density of the air-liquid mixture above the disc changes constantly, causing the disc to flutter slightly between the retaining member and the rim. If any solid particles become lodged between the disc and the rim of the fitting, the slight flutter of the disc causes them to be rapidly loosened and/or worn away, and removed. When the air is shut off, the pressure of the liquid forces the disc against the rim to seal the diffuser and prevent any back flow of liquid through the header.

The pattern of diffusion is proportional to the depth of immersion, the spreading of the air increasing as the depth of the diffuser is increased. The air pressure is regulated in accordance with the pressure of the liquid against the upper surface of the disc. The disc is held in spaced relationship to the rim while air is being dispersed. The opening between the disc and the rim varies with the depth to which the diffuser is immersed and the volume of air discharged.

The structure by means of which the above mentioned and other advantages of the invention are attained will be described in the following specification, taken in conjunction with the accompanying drawings, showing two preferred illustrative embodiments of the invention, in which:

FIGURE 1 is a top plan view of a fitting looking through the air chamber into the orifice;

FIG. 2 is a top plan view of the diffuser showing a retaining member secured to the fitting above the disc;

FIG. 3 is a cross sectional view, taken along the line 3—3 of FIG. 2;

FIG. 4 is a side elevational view of the diffuser;

FIG. 5 is a fragmentary cross sectional view showing the disc in its outermost position;

FIG. 6 is a detail perspective view of the retaining member used in the embodiment of the invention shown in FIGS. 1 to 5;

FIG. 7 is a detail perspective view of the disc;

FIG. 8 is a top plan view of a diffuser, showing another embodiment of the retaining member;

FIG. 9 is a cross sectional view, taken along the line 9—9 of FIG. 8;

FIG. 10 is a top plan view, taken on the plane of line 10—10 of FIG. 9; and

FIG. 11 is a side elevational view, showing the disc in its outermost position.

In the drawings, the reference numeral 2 indicates a fitting having a nipple 3 at one end and an air chamber 4 of approximately bell shape at its outer end. An orifice 5 may be positioned in the outer end of nipple 3. The nipple is threaded on its outer surface, as indicated at 6, for attachment to a header (not shown) or to any other suitable source of air under pressure. The nipple has a longitudinal bore 3' which communicates with the smaller end of air chamber 4. The cross sectional area of the air chamber increases uniformly from the end contiguous to bore 3' to the outer end. The outer edge of the fitting has a flat rim 7. It will be understood that although the air chamber is preferably circular in transverse cross section, it may be of any desired configuration.

Fitting 2 is preferably an integral casting and is provided on its outer edge with a plurality of integral lugs 8 projecting beyond the plane of the flat surface of rim 7 and spaced circumferentially of the fitting. In the drawing, three lugs are shown spaced 120° from each other at the outer edge of the air chamber, but the number of lugs and their specific spacing will depend upon the transverse cross sectional shape of the fitting. The inner surface of each lug 8 is recessed slightly, as indicated at 9, to space it laterally outwardly a short distance from the outer circumference of rim 7 for a purpose hereinafter described.

A flat disc 10, preferably made of resin, for example, polyvinyl chloride, but which may be made of rubber, metal, or other suitable material, is positioned on flat rim 7 between the lugs 8. It is preferred to make disc 10 of material heavier than water because the diffuser is normally immersed in the liquid to be aerated with the disc uppermost, and a disc heavier than water seats itself on the rim more readily than a lighter disc when the air pressure is cut off. The peripheral edge of the disc preferably coincides with the peripheral edge of the rim, but, in any event, the outer edge portion of the disc overlaps the rim a sufficient distance to prevent any portion of the air chamber from being uncovered by the lateral movement of the disc. Recesses 9 in the inner surfaces of lugs 8 permit disc 10 to move slightly in any lateral direction to prevent the disc from becoming stuck between the lugs 8.

Each lug has a transversely extending notch 11 on its outer surface. Notches 11 are in a common plane spaced from the plane of flat rim 7 a predetermined distance which is greater than the thickness of disc 10, depending upon the maximum amount of opening desired between rim 7 and disc 10. A retaining member in the form of a closed loop 12 of resilient wire, preferably stainless steel, has three straight sections 13 adapted to fit in the notches 11, and intermediate sections 14 curved inwardly between the outer ends of the straight sections. The curvature of sections 14 is such that when the wire is loose, the straight sections are spaced too closely to the center of the wire loop to fit around the outer surfaces of lugs 8. The upper outer edge of each lug is beveled slightly, as indicated at 15, so that the wire loop may be expanded slightly as it is pressed downwardly on lugs 8. The resiliency of the wire causes it to snap into notches 11 to hold the wire in predetermined spaced relationship to flat rim 7.

The curvature of wire 12 also makes it overlie the outer surface of disc 10 to limit the outward movement of the disc perpendicular to the plane of rim 7 in response to the air pressure against its inner surface. When it is desired to remove disc 10, a slight outward pressure against curved sections 14 in the plane of the wire loop tends to straighten the curved sections enough to move straight sections 13 outwardly to release them from notches 11 and permit removal of the wire from the lugs.

When the diffuser is immersed in sewage or other material to be aerated, air under pressure flows through orifice 5 and into air chamber 4. The air circulates freely in the air chamber, and exerts pressure against the underside of disc 10 uniformly throughout the area overlying the outer end of the air chamber to lift the disc evenly to a maximum predetermined distance from flat rim 7. The pressure of the liquid tends to force disc 10 towards the rim, with the result that the size of the opening between the disc and the rim is limited by the quantity of air flowing through the diffuser. The disc normally is not pressed against retaining member 12 but more or less flutters or "floats" in the liquid between the rim and the retaining member. The variable nature of the opening, short of the outer limit of the retaining member, causes the head loss to be less than in the case of a diffuser having a fixed opening.

The density of the mixture of air and liquid just above the disc keeps changing constantly, and causes the disc to flutter between retaining member 12 and flat rim 7. If any solids from the sewage lodge between the rim and the disc, the fluttering of the disc loosens them and/or abrades them away, and they are immediately displaced either by the vibration of the plate or the flow of air. When the air is shut off, the pressure of the liquid immediately forces the disc into contact with flat rim 7 to seal the diffuser and prevent any of the liquid from flowing into the fitting.

In the embodiment of the invention shown in FIGS. 8 to 11, the fitting 2' is essentially the same as the previous embodiment, and identical structure is indicated by the same reference numerals. In this embodiment, lugs or projections 16 are provided with threaded bores 17 for receiving screws 18 which hold a retaining member 19 against the outer ends of the lugs. The inner surface of each lug 16 is recessed slightly, as indicated at 20, to space it laterally outwardly a short distance from the outer circumference of rim 7.

Retaining member 19 is a flat plate having laterally projecting ears 21 adapted to fit over lugs 16 and apertured to permit screws 18 to pass therethrough. Although the plate may be imperforate, it is preferred to have a large central opening 22 which leaves an annular portion engageable with the outer edge portion of disc 10 to restrict its outward movement in a direction perpendicular to the plane of rim 7. The retaining member is preferably stainless steel, but may be of any suitable material. As in the previous embodiment, retaining member 19 is rigidly held in a plane parallel to the plane of rim 7 at a distance greater than the thickness of disc 10 and may be readily removed when necessary. Screws 18 may be removed to remove the retaining member or, if desired, two of the screws may be removed and the other one loosened to allow the retaining member to be moved pivotally about the loosened screw to permit disc 10 to be removed.

While I have described two preferred embodiments of my invention in considerable detail, it will be understood that the description thereof is illustrative, rather than restrictive, as many details may be modified or changed without departing from the spirit or scope of my invention. Accordingly, I do not desire to be restricted to the exact structure described.

I claim:

1. A diffuser adapted to aerate a medium in which it is immersed, said diffuser comprising a fitting provided with means at one end for connection to a source of air under pressure, said fitting having an air chamber having an outer end and a flat rim surrounding the outer end of said air chamber, a flat disc seated on said rim, said disc being adapted to form a seal with said rim, projections extending from said rim and engageable with said disc to limit its lateral movement, and a retaining member having a flat surface extending from said projections over said rim in a plane parallel to the plane of said rim at a distance from said rim greater than the thickness of said disc, said retaining member being engageable with said disc for limiting the movement of said disc in a direction perpendicular to the plane of said rim.

2. A diffuser adapted to aerate a medium in which it is immersed, said diffuser comprising a fitting provided with means at one end for connection to a source of air under pressure, said fitting having an air chamber having an outer end and a flat rim surrounding the outer end of said air chamber, a plurality of circumferentially spaced lugs extending laterally and angularly from said fitting beyond the periphery of said rim, a flat disc seated on said rim between said lugs, said disc being adapted to form a seal with said rim, said lugs being engageable with the peripheral edge of said disc to limit its lateral movement, said disc being movable outwardly in a direction perpendicular to the plane of said rim in response to air pressure against said disc, and retaining means mounted on said lugs at a distance from said rim greater than the thickness of said disc, said retaining means being engageable with said disc for limiting the movement of said disc in a direction perpendicular to the plane of said rim.

3. A diffuser comprising a fitting provided with an air chamber having an outer end and means for connection to a source of air under pressure, said fitting having a flat rim surrounding the outer end of said air chamber, a plurality of circumferentially spaced lugs extending from said fitting beyond the periphery of the flat surface of said rim, a flat disc seated on said rim between said lugs, said disc having an inner surface and being movable outwardly in a direction perpendicular to said rim in response to air pressure against its inner surface, and a retaining wire extending around the outer surface of said lugs in a plane parallel to the flat surface of said rim and spaced therefrom a distance greater than the thickness of said disc, said retaining wire having a section extending inwardly of said lugs to engage said disc and thereby limit the outward movement of said disc relative to said rim.

4. A diffuser comprising a fitting provided with an air chamber having an outer end and means for connection to a source of air under pressure, said fitting having a flat rim surrounding the outer end of said air chamber, a plurality of circumferentially spaced lugs extending from said fitting beyond the periphery of the flat surface of said rim, a flat disc seated on said rim between said lugs, said disc having an inner surface and being movable outwardly in a direction perpendicular to said rim in response to air pressure against its inner surface, and a wire loop having sections resiliently held against the outer surfaces of said lugs and intermediate sections curved inwardly in a plane spaced from said rim a distance greater than the thickness of said disc, said intermediate sections of said wire loop being parallel to said rim to overlie said disc, said intermediate sections being engageable with said disc to thereby limit the outward movement of said disc relative to said rim.

5. A diffuser comprising a fitting provided with an air chamber having an outer end and means for connection to a source of air under pressure, said fitting having a flat rim surrounding the outer end of said air chamber, a plurality of circumferentially spaced lugs extending from said fitting beyond the periphery of the flat surface of said rim, each of said lugs having a transversely extending notch in a common plane spaced from and parallel to said rim, a flat disc seated on said rim between said lugs, said disc having an inner surface and being movable outwardly in a direction perpendicular to said rim in response to air pressure against its inner surface to disperse air through the space between said disc and said rim, and a wire retaining member extending around the outer surfaces of said lugs and positioned in said notches, said wire retaining member having a section overlying said disc and spaced therefrom a distance greater than the thickness of said disc, said section being engageable with said disc to limit the outward movement of said disc relative to said rim.

6. A diffuser comprising a fitting provided with an air chamber having an outer end and means for connection to a source of air under pressure, said fitting having a flat rim surrounding the outer end of said air chamber, a plurality of circumferentially spaced lugs extending from said fitting beyond the periphery of the flat surface of said rim, each of said lugs having a transversely extending notch in a common plane spaced from and parallel to said rim, a flat disc seated on said rim between said lugs, said disc having an inner surface and being movable outwardly in a direction perpendicular to said rim in response to air pressure against its inner surface to disperse air through the space between said disc and said rim, and a wire loop resiliently held in said notches, said wire loop having intermediate sections curved inwardly between said lugs in the plane of said notches to overlie said disc, said disc being thinner than the space between said wire and the flat surface of said rim and engageable with the intermediate sections of said wire loop to thereby limit the outward movement of said disc relative to said rim, the intermediate sections of said wire loop being movable outwardly in said common plane to release said wire loop from engagement with said notches.

7. A diffuser comprising a fitting provided with an air chamber having an outer end and means for connection to a source of air under pressure, said fitting having a flat rim surrounding the outer end of said air chamber, a flat disc seated on said rim, a plurality of circumferentially spaced lugs projecting from said fitting beyond the periphery of the flat surface of said rim, each of said lugs being spaced from said disc to permit limited lateral movement of said disc, said lugs each having an outer surface provided with a transverse notch positioned beyond the periphery of said disc, and a retaining wire extending in said notches and detachably secured to said lugs, said wire being engageable with said disc to permit limited outward movement of said disc from said rim.

8. In an air diffuser, a fitting provided with an air chamber having an outer end, a disc for closing the outer end of said air chamber, a plurality of lugs projecting from said fitting beyond the periphery of said disc, and a resilient wire retaining member fitting around said lugs and having inwardly curved sections overlying said disc, said inwardly curved sections being spaced from the outer end of said air chamber a distance greater than the thickness of said disc and engageable with said disc to permit limited movement of said disc away from the outer end of said air chamber.

9. A diffuser adapted to aerate a medium in which it is immersed, said diffuser comprising a fitting provided with means at one end for connection to a source of air under pressure, said fitting having an air chamber having an outer end and a flat rim surrounding the outer end of said air chamber, a plurality of integral lugs extending upwardly from said fitting outside the periphery of said rim, a flat disc seated on said rim, said disc being adapted to form a seal with said rim, said disc being located between said lugs and engageable with said lugs to limit its lateral movement, said disc having an inner surface and being movable relative to said rim in response to fluctuations in the air pressure against its inner surface, and retaining means having a plurality of laterally projecting ears secured to said lugs, said retaining means extending between said lugs in a plane parallel to the plane of said rim at a distance from said rim greater than the thickness of said disc, said retaining means being engageable with said disc for limiting its movement outwardly from the plane of said rim.

10. A diffuser adapted to aerate a medium in which its is immersed, said diffuser comprising a fitting provided with means at one end for connection to a source of air under pressure, said fitting having an air chamber having an outer end adjacent the opposite end of said fitting and a flat rim surrounding the outer end of said air chamber, a closure member adapted to seat on said rim in alignment with the outer end of said air chamber to seal said air chamber, said closure member having an inner surface and being movable outwardly from said rim in response to air pressure against its inner surface, a plurality of projections extending at an angle to the flat surface of said rim and engageable with said closure member to maintain its alignment with the outer end of said air chamber, and a retaining member having laterally projecting ears secured to said projections outwardly of said closure member, said retaining member being engageable with said closure member to limit its movement outwardly from said rim.

11. A diffuser adapted to aerate a medium in which it is immersed, said diffuser comprising a fitting provided with means at one end for connection to a source of air under pressure, said fitting having an air chamber having an outer end adjacent the opposite end of said fitting and a flat rim surrounding the outer end of said air chamber, a flat disc seated on said rim, said disc being adapted to form a seal with said rim, said disc having an inner surface and being movable outwardly in a direction perpendicular to said rim in response to air pressure against its inner surface, a plurality of projections extending at an angle to the flat surface of said rim and engageable with said disc to limit its lateral movement, and a retaining member overlying said projections and extending inwardly between said projections in a plane parallel to the flat surface of said rim and spaced therefrom a distance greater than the thickness of said disc, said retaining member being engageable with said disc to limit the outward movement of said disc in a direction perpendicular to the plane of the flat surface of said rim.

12. A diffuser adapted to aerate a medium in which it is immersed, said diffuser comprising a fitting provided with means at one end for connection to a source of air under pressure, said fitting having an air chamber having an outer end adjacent the opposite end of said fitting and a flat rim surrounding the outer end of said air chamber, a flat disc seated on said rim, said disc being adapted to form a seal with said rim, said disc having an inner surface and being movable outwardly in a direction perpendicular to said rim in response to air pressure against its inner surface, a plurality of projections extending at an angle to the flat surface of said rim in spaced relationship to said disc, said projections being engageable with said disc to limit its lateral movement, and retaining means overlying said projections and extending inwardly therefrom, said retaining means being spaced from said rim a distance greater than the thickness of said disc and being engageable with said disc to limit the outward movement of said disc in a direction perpendicular to the plane of the flat surface of said rim.

13. A diffuser adapted to aerate a medium in which it is immersed, said diffuser comprising a fitting provided with means at one end for connection to a source of air under pressure, said fitting having an air chamber having an outer end adjacent the opposite end of said fitting and a flat rim surrounding the outer end of said air chamber, a flat disc seated on said rim, said disc being adapted to form a seal with said rim, said disc having an inner surface and being movable outwardly in a direction perpendicular to said rim in response to air pressure against its inner surface, a plurality of circumferentially spaced lugs extending from said fitting, said lugs being spaced from said disc to permit limited lateral movement of said disc, and a retaining member overlying said lugs and secured thereto in a plane parallel to the plane of the flat surface of said rim and spaced therefrom a distance greater than the thickness of said disc, a portion of said retaining member extending inwardly of said lugs, said inwardly extending portion of said retaining member being engageable with said disc to limit the outward movement of said disc in a direction perpendicular to the plane of the flat surface of said rim.

References Cited in the file of this patent
UNITED STATES PATENTS

| 1,948,676 | Riek | Feb. 27, 1934 |
| 2,550,100 | Voss | Apr. 24, 1951 |
| 2,658,737 | Nutter | Nov. 10, 1953 |
| 2,772,080 | Huggins | Nov. 27, 1956 |
| 2,819,050 | Huggins | Jan. 7, 1958 |